UNITED STATES PATENT OFFICE.

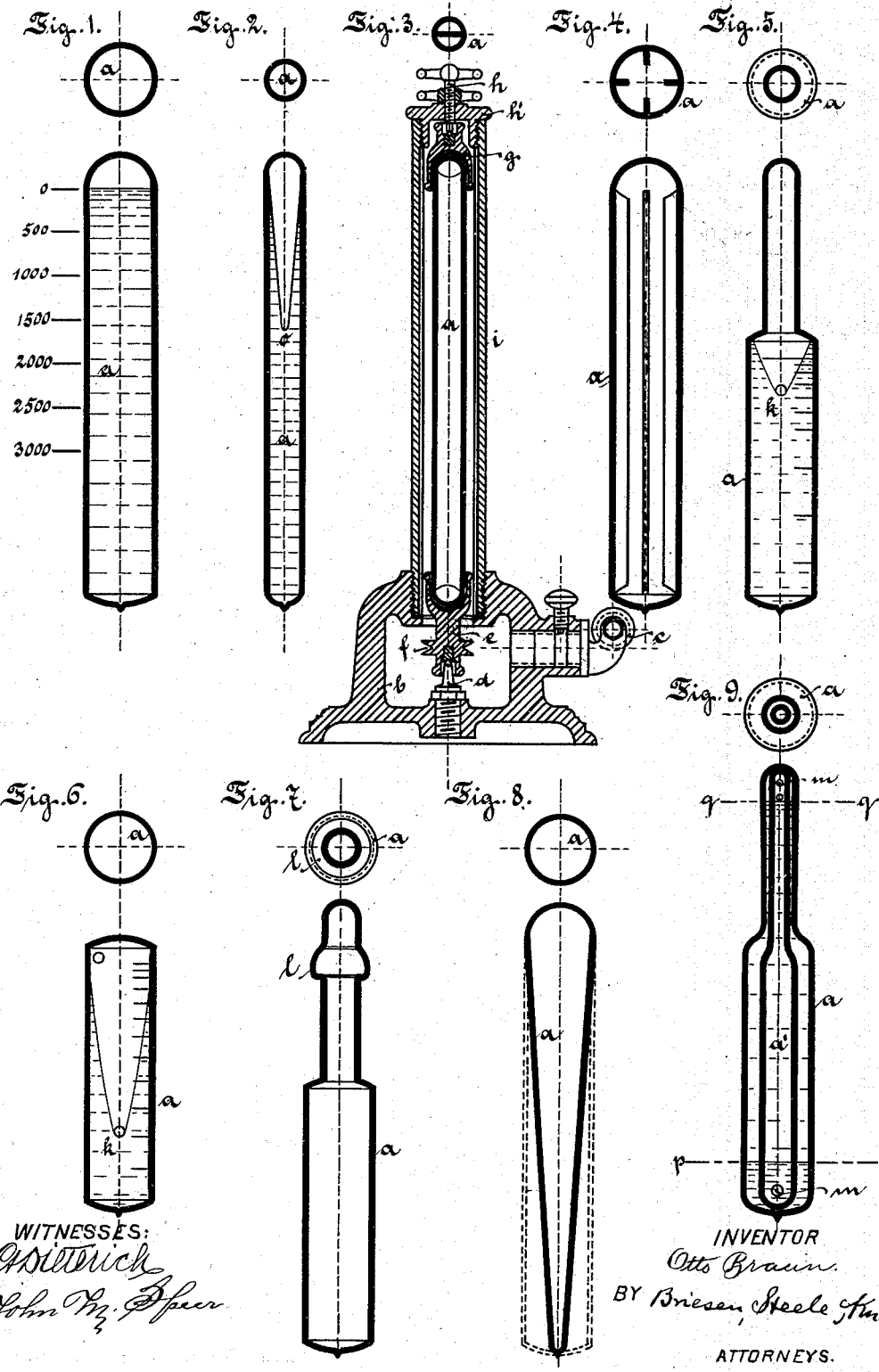

OTTO BRAUN, OF BERLIN, GERMANY.

SPEED-GAGE.

SPECIFICATION forming part of Letters Patent No. 416,896, dated December 10, 1889.

Application filed February 20, 1889. Serial No. 300,574. (No model.) Patented in Germany February 13, 1887, No. 42,603.

*To all whom it may concern:*

Be it known that I, OTTO BRAUN, of the city of Berlin, in the Kingdom of Prussia, German Empire, have invented Improvements in Speed-Gages, (for which I have received Letters Patent as follows: Germany, No. 42,603, February 13, 1887,) of which the following is a specification.

In the accompanying drawings, Figure 1 is a vertical cross-section of my speed-gage. Fig. 2 is a similar view of a smaller-sized gage. Fig. 3 is a longitudinal sectional view showing means for actuating the speed-gage, and Figs. 4, 5, 6, 7, 8, and 9 represent modifications of my speed-gage.

The same letters of reference denote corresponding parts.

The object of the apparatus or device illustrated by the accompanying drawings is to indicate and to measure the number of revolutions or the speed of a rotating object with which it is united, directly or indirectly, by suitable means.

The said apparatus consists of a glass tube both ends of which are hermetically sealed, preferably by melting the glass, which is filled partly with a fluid or fluids, and which is rotated around its longitudinal axis. The tube is graduated or combined with a graduation. As soon as the tube rotates the fluid is forced by centrifugal power against the wall of the tube and will therefore rise along it less or more, according to the tube making in a certain time less or more revolutions. The height to which the fluid rises will always correspond with a certain number of revolutions of the tube, and therefore the speed of the latter can be read off from a graduation provided on it. The tube can be fastened directly to the rotating object in line with the axis of rotation by convenient means, showing in such case directly the speed of the object; or it can be mounted as an independent instrument, separated from the rotating object, and receive its rotation from the rotating object by means of a cord, belt, gearing, or other suitable mechanisms, in which case the purchase between the rotating object and the tube must be considered to get, by a simple calculation, if necessary, the true speed of the object from the marked speed of the tube.

In Figs. 1 and 2 are shown two glass tubes $a$ $a$, melted up at their rounded ends and filled partly with any fluid. In case the gage is intended to work slowly, the tube $a$ must be proportionately wide and the fluid thin—water, alcohol, &c., Fig. 1. Should it work quickly, the tube $a$ must be narrower and the fluid thicker—oil, glycerine, &c., Fig 2. As the limits of the raised fluid, even if it be colored, can be distinguished only with difficulty, and as the surface of the fluid forms a funnel or paraboloid, the apex $o$ of which is seen always distinctly, the latter is preferably qualified to be used as the critical point for the scale or graduation, as is represented in Fig. 2.

Fig. 3 shows a speed-gage constructed as an independent speed-measuring instrument, which can be connected by a cord or belt and suitably arranged guide-sheaves to a driving-pulley of the object the number of revolutions of which is to be measured. $b$ is a heavy pedestal furnished with two adjustable guide-sheaves $c$ for the driving-belt, and a step $d$, which supports and upon which revolves the gage-glass $a$ by means of its lower frame $e$, which is provided, also, with a small belt or cord sheave $f$. For steadying the glass tube $a$, a frame $g$ is mounted upon its top end, which rotates around the lower end of an adjustable screw $h$ in the head $h'$ of a pipe $i$, which is screwed into the top of the pedestal $b$ and surrounds the pipe $i$. The pipe $i$ has in its wall longitudinal openings, through which the position of the fluid in the gage-tube $a$ can be observed and the graduation can be seen, which latter may be made on the tube $a$, or any other desired object.

The tube $a$ may be provided with an interior glass partition, as in the cross-section of Fig. 3, or with interior webs or ribs, as in Fig. 4, for facilitating the discovering of the position of the fluid. If the interior of the tube $a$ is made without such obstructions, the apex $o$ of the funnel formed by the rotation of the tube $a$ and the liquid in it must be observed, or, still better, a hollow ball $k$, of dark glass, floating upon the fluid and remaining always at the said apex $o$, will distinguish this point very clearly. (See Figs. 5 and 6.)

In Fig. 6 the small circle in the upper part of the tube $a$ shows the occasional position of the ball $k$ if the tube $a$ is not in motion. As soon as the tube $a$ is rotated axially the ball $k$ retires to the axis, where it remains floating on the fluid and sinking with the sinking apex $o$ of the fluid funnel.

For different purposes the shape of the glass tube of the speed-gage may be altered, (for example see Figs. 7, 8, and 9.)

Fig. 7 shows the upper portion of the tube $a$ of smaller diameter than the lower, and provided with a short bulging out at $l$, which retains some of the fluid in case the speed of the tube $a$ had been so great as to have driven the fluid up to or over this bulged portion $l$. By this means can be proved afterward that the speed had once reached that height or exceeded an allowed slower speed. The instrument becomes by this construction a kind of "maximum" speed-gage.

In general, tubes of the kind shown in Figs. 5 and 7 allow within certain limits a wider graduation than the tubes of the kind shown in Fig. 6, as the narrow upper portion of the former takes up a portion of the raised fluid, thereby reducing the contents of the lower wider portion.

It may be here remarked that the graduation is an empiric one and must be divided for each single instrument.

Fig. 8 shows another shape of the tube $a$, which acts similar to that of Fig. 1.

In Fig. 9 the tube $a$, similar in shape to that of Fig. 5, contains a second concentric smaller tube $a'$, united firmly, by melting, to the tube $a$, or otherwise. The interior of the tube $a'$ communicates by some holes $m$ in its wall near the top and the bottom with the interior of the tube $a$, or the tube $a'$ may for the same purpose be open on both ends. The tubes $a$ and $a'$ are filled partly with mercury (up to $p\,p$) and partly with water (up to $g\,g$.) The effect of this construction is that the instrument will indicate, at a low speed, as the alteration of the surface of the heavier mercury is transferred to the small cross-section of the narrow tube $a'$.

Having shown and explained the essential features of the invention and pointed out that it can be carried out in practice by constructing speed-gages of different forms and shapes, what I claim as new, and desire to secure by Letters Patent, is—

The pedestal $b$, having step $d$, and the vertical tube $i$, combined with the fluid-tube $a$, having rounded ends made in one piece with its main portion and the frame $e$ and with the frame $g$ at the upper end of the tube $a$, head $h'$ on the tube $i$, and screw $h$, substantially as described.

This specification signed by me this 18th day of January, 1889.

OTTO BRAUN.

Witnesses:
EARL T. BURRHARDT,
ULR. R. MAERS.